United States Patent
Holzer

Patent Number: 5,282,684
Date of Patent: Feb. 1, 1994

[54] DEVICE FOR MONITORING THE TEMPERATURE OF COOLED OR DEEP-FROZEN PRODUCTS

[76] Inventor: Walter Holzer, Drosteweg 19, Meersburg, Fed. Rep. of Germany, 7758

[21] Appl. No.: 82,416

[22] Filed: Aug. 6, 1987

[30] Foreign Application Priority Data

Feb. 13, 1987 [DE] Fed. Rep. of Germany ....... 3704615
Apr. 14, 1987 [DE] Fed. Rep. of Germany ....... 3712201

[51] Int. Cl.$^5$ ........................................... G01K 11/00
[52] U.S. Cl. ................................................... 374/160
[58] Field of Search ...................... 374/159, 160, 161; 116/216, 217, 218, 219

[56] References Cited

U.S. PATENT DOCUMENTS

| | | | |
|---|---|---|---|
| Re. 25,499 | 12/1963 | Fenity et al. ........................ | 116/217 |
| 34,203 | 1/1862 | Franklin ............................. | 374/160 |
| 3,002,385 | 10/1961 | Wahl et al. ........................ | 116/217 |
| 3,047,405 | 7/1962 | Lanier ................................ | 116/217 |
| 3,243,303 | 3/1966 | Johnson ............................. | 116/217 |
| 3,597,976 | 8/1971 | Fryar .................................. | 374/160 |
| 3,696,679 | 10/1972 | Peterson et al. .................... | 116/217 |
| 3,701,282 | 10/1972 | Peterson ............................. | 116/217 |
| 4,022,149 | 5/1977 | Berger ................................. | 116/219 |
| 4,353,990 | 10/1982 | Manske et al. ..................... | 374/160 |
| 4,457,253 | 7/1984 | Manske .............................. | 374/160 |
| 4,459,046 | 7/1984 | Spirg .................................. | 374/161 |

FOREIGN PATENT DOCUMENTS

1206629 1/1986 U.S.S.R. ............... 374/160

*Primary Examiner*—William A. Cuchlinski, Jr.
*Assistant Examiner*—Patrick R. Scanlon
*Attorney, Agent, or Firm*—Nilsson, Robbins, Dalgarn, Berliner, Carson & Wurst

[57] ABSTRACT

An indicator used for monitoring whether or not a cooled or deep-frozen product has exceeded a preset critical temperature. The indicator includes a hollow shape which is symmetrically divided by separating walls. This structure allows the indicator fluids to be placed on a circular radius within the hollow shape. This design also exhibits a special centrifugal axis. This axis allows the fact that the products have reached the critical temperature to be disclosed in the following manner: the indicator fluids melt and move away from their resting place in the hollow shape. If the fluids are re-frozen, they can not return to their prior resting place because the fluids arrived at that original resting place due to centrifugation. Thus, departure from the fluids' centrifuged state gives notice that the products have reached their critical temperature.

1 Claim, 4 Drawing Sheets

DEVICE FOR MONITORING THE TEMPERATURE OF COOLED OR DEEP-FROZEN PRODUCTS

BACKGROUND OF THE INVENTION

This invention relates to a device for monitoring the temperature of cooled or deep-frozen products, such as foodstuffs, pharmaceuticals and the like, which device provides a permanent indication that a critical temperature has been exceeded.

Cooled or deep-frozen foodstuffs or other products may be preserved perfectly only if they are constantly and uninterruptedly kept below a critical temperature. In the case of cooled products, this temperature amounts to +8° C., for example, and to −17° C. for example in the case of deep-frozen products.

Even a brief heating action followed by refreezing may lead to serious deleterious changes to the products, e.g. foodstuffs, which frequently cause serious damage to health. Analogous remarks apply regarding pharmaceuticals, preserved blood and other products.

Strict monitoring of the "cooling chain" is required, particularly in the case of industrial chilling or freezing, until the defrosting operation prior to consumption of the foodstuffs.

Technical failures, as well as human oversights, are unfortunately never wholly preventable. The invention has as its object to specify a device which permits an uninterrupted verification that the specified critical temperatures had actually never been exceeded.

Until now, a monitoring operation on such cooled or deep-frozen products was only possible with difficulty. As a rule, use was made for this purpose of thermometers comprising following pointers, from which it was then possible to observe a rise above the critical temperature to the point of thawing of the cooled or deep-frozen product on the basis of the position of the following pointer. However, on the one hand such thermometers are comparatively costly and on the other hand, are easily manipulated.

SUMMARY OF THE INVENTION

Consequently, a fundamental object of the invention is to develop a device of the kind defined in the foregoing, whereby a rise above a critical temperature of the cooled or deep-frozen products may be monitored in uncomplicated manner and at little expense.

For resolution of the problem posed, the invention is characterised in that the device is constructed as an indicator unit and contains an indicator fluid, the melting point of which lies at the critical temperature and which is packed in the frozen state with the cooled or deep-frozen product in such manner that it is visible from the outside and in thermally conductive contact with said product.

The device according to the invention is produced by fluid being frozen in a specific shape for example as an indicator showing a temperature level, which shape is destroyed irreversibly by the melting action upon reaching the melting point.

The essence of the present invention consequently consists in that the change of the aggregate state of the indicator is used to indicate that the critical temperature which is to be monitored has been exceeded to the point of thawing the cooled or deep-frozen product. The indicator is preferably fluid or semi-fluid above the critical temperature required. Whilst in this state, this indicator is shaped into a specific geometrical form, for example by placing this fluid or semi-fluid substance in a casting mould which describes a spheroidal, tablet-like or other geometrical shape. The indicator substance is then frozen in this shape, to which end its substantial composition is so selected that it changes its aggregate state close to the critical temperature and passes from the fluid or semi-fluid form into a solid specific form. After its temperature has dropped below the freezing point of this substance, it consequently solidifies in the mould and may easily be stripped from the same, so that the indicator is available as a frozen substance in the particular geometrical form specified. In this state, it is then either packaged together with the cooled or deep-frozen product as it is, or it is placed in an indicator unit, which is a container in the simplest case and is transparent at least at one side, so that a possible thawing of this indicator substance may easily be observed if the cooled or deep-frozen product itself unacceptably exceeds a critical temperature to the point of thawing.

Also, the indicator itself melts as the critical temperature is exceeded and irreversibly loses its specific geometrical shape. What is of importance in this connection is that the container (indicator unit) should also permit an irreversible change in shape of the indicator substance.

It is thus possible to produce economical and easily utilised indicators, by means of which a break in the cooling chain in the case of cooled or deep-frozen products can easily be detected. For this purpose, the indicator substance is preferably a fluid or a gel.

Alcohol-water mixtures or alcohol-water-glycol mixtures, which have a freezing point below 0° Centigrade, are particularly preferred as possible fluids. Fluids having a melting point above 0° Centigrade are utilised as indicator substances for monitoring products cooled to above 0° Centigrade. A melting point of say +8° Centigrade is obtained by use of a mixture of 80% of water and formic or acetic acid, thereby rendering it possible to monitor the warming of cooled products.

All the substances which change their aggregate state at the critical temperature of the deep-frozen product which is to be monitored, are covered for this purpose by the scope of the present invention.

If the monitoring operation is to be made more positive, several indicators having different melting points are provided, and it is recommended that the temperatures be specified by legends and/or colouration e.g. in green, yellow and red colours. To this end, as in traffic signs, the colours could denote:

"green"=no danger,
"yellow"=attention, care is required, and
"red"=danger.

Combinations of the indicator symbols are also recommended, e.g. "green" with the marking "15", "yellow" with the marking "10" and "red" with the marking "0", the numerals also being used to provide a direct indication of the approximate melting point.

In accordance with the invention, the indicators, for example being in the form of small spheroids or tablets, are initially frozen and are subsequently sorted out, either singly or in groups corresponding to the characteristic temperatures, for inclusion in thermally conductive manner, as a packaged unit, with the cooled or deep-frozen product which is to be monitored.

For a simplified application, it is recommended according to the invention to provide a pack for the indicators which on the one hand prevents any impairment to the foodstuffs, and on the other hand permits easy monitoring, e.g. by means of transparency.

It has repeatedly been stated in the preceding description, that the indicator should assume a solid or "fixed" shape upon freezing. This concept of a "fixed shape" should be interpreted merely as a relative term within the scope of the specified inventive concept, since, for example, some aqueous solutions merely freeze into "semisolid", i.e. gelatinous structures.

Moreover, the critical temperature need not be specified as a precise point, since particular mixtures of substances freeze within the range of a particular "band width" and the melting of a mixture of substances of this kind may occur throughout a particular temperature range.

The indicator 21 can be provided moreover as a single substance or as a mixture of substances in a respective cavity of the indicator unit. In a modification, the indicator may however comprise a plurality of small identical (frozen) spheroids which are placed together in a cavity. The forming of the indicator from a plurality of small individual spheroids or other individual elements may be selected for reasons connected with production or else on the grounds of improved visibility.

Instead of constructing the plate-like carrier with hollow annular circles, circular segments or other hollow shapes, it is possible to utilise any other arbitrary hollow shape. Forming the hollow shapes into spheroidal caps proved to be particularly advantageous because their production is particularly uncomplicated.

The schematically illustrated examples should merely be interpreted as such, since numerous other specific forms, which are lost irreversibly after melting are also possible. Further references in this connection are apparent from the drawings.

The object of the present invention is disclosed not only by the object of the individual claims but also by the combination of the individual claims with one another. All the data and features disclosed in the documents inclusive of the abstract and in particular the present embodiment illustrated in the drawings, are claimed as being essential to the invention, inasmuch as they are novel singly or in combination compared to the prior art.

The invention is described in particular in the following with reference to the drawings illustrating several modes of embodiment. To this end, other features and advantages of the invention are apparent from the drawings and their description.

DETAILED DESCRIPTION OF THE PREFERRED EMBODIMENTS

Figure 1:
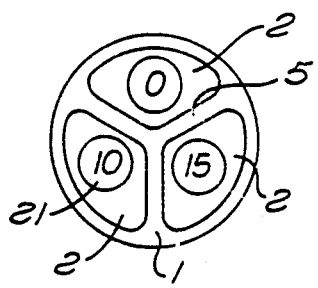
FIG. 1 is a plan view of an indicator unit in its operative condition below a temperature of $-15°$ C., for example.

FIG. 1 illustrates a round indicator unit 1, e.g. formed by interwelded foils of transparent plastics material, wherein three indicators 21 "0", "10" and "15" were placed in cavities 2 in the frozen state. The legends of the indicators can correspond to the melting points in question, for example. It is equally recommended that the indicators be dyed in different colours for the different temperatures.

Figure 2:
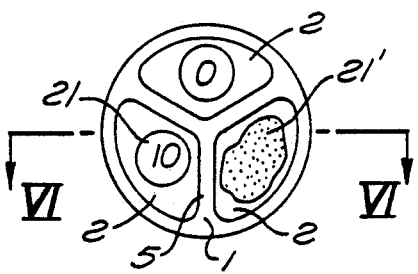
FIG. 2 shows the same indicator unit as FIG. 1 within a temperature range of between $-15°$ C. and $-10°$ C., for example.

The indicator unit 1 is illustrated in FIG. 1 and has a melting point of minus 15° C. If the temperature rises above $-15°$ C., the state shown in FIG. 2 is initially reached, i.e. the indicators "0" and "10" are still unchanged, whereas the indicator "15" has melted and lost its tablet shaped form.

Figure 3:
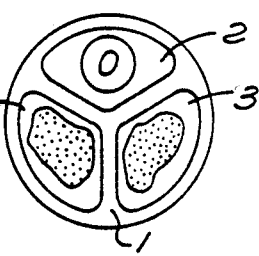
FIG. 3 shows the same indicator unit as before, within the temperature range below $0°$ C.

As the temperature rises above $-10°$ C., the state shown in FIG. 3 is attained, so that only the indicator "0" is unchanged, whilst both indicators "10" and "15" are melted. During further heating above 0° C., the indicator "0" finally also melts and the temperature limit exceeded in each case may be correctly detected.

Figure 4:
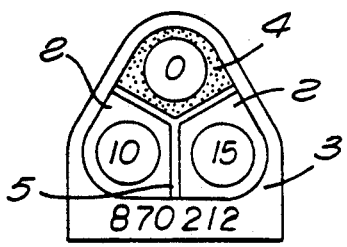
FIG. 4 shows another form of embodiment of an indicator unit.

Another exemplifying embodiment is illustrated in FIG. 4. A space is provided in this case on the indicator unit 3 for a legend, e.g. "870212" as a supplemental coding. The indicators "10" and "15" are again contained in the cavities 2, whereas the indicator in the third cavity, being the indicator "0", is surrounded by a composition 4 which has the property of expanding considerably upon being wetted with fluid. FIG. 4 firstly illustrates the indicator unit 3 in the frozen state below $-15°$ C. All three indicators "0", "10" and "15" have their specific tablet shape.

Figure 5:
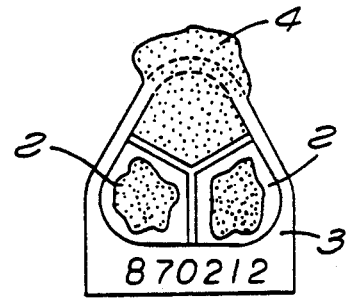
FIG. 5 shows the indicator unit as in FIG. 4 after the critical temperature range has been exceeded.

By contrast, FIG. 5 shows the same indicator unit after the temperature "0" is exceeded. All three indicators have melted, but the greatly expanded composition 4 has burst the indicator unit and -merged into the package, thereby colouring the foodstuffs for example and thereby indicating the same as being inedible. In the case of the exemplifying round indicator unit 1 or in that of the example of the indicator unit 3, separating ribs 5 are provided which prevent mixing of the molten fluids and permit clearer detection of the condition.

Figure 6:
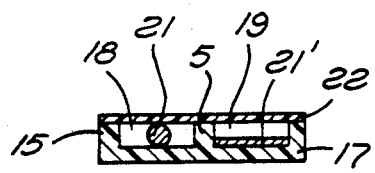
FIG. 6 shows a section through the indicator unit shown in FIG. 2 in the direction of the arrow VI—VI.

FIG. 6 is a schematic illustration of a possible form of embodiment of an indicator unit according to FIGS. 1 to 3.

The cavities 2 depicted in FIGS. 1-5 are situated in an upwardly open container 17, which is produced as a plastics material injection moulding, as an expanded component or stamped out of a sheet. Each cavity is defined by the encircling rim 15 of the container 17 in conjunction with one or more separating ribs 5.

To this end, each cavity 2 has contained in it an indicator 21 which in the embodiment in FIGS. 2 and 6 is not yet molten in the left-hand side cavity, whereas the indicator 21' in the right-hand side cavity has melted, for example because the indicator unit 1 had been exposed to a temperature above −15° C. and below −10° C.

The indicator 21' has consequently lost its fixed specific geometrical shape and settled on the bottom of the cavity 2.

It is then easily possible to detect via the transparent foil 22 covering the container 17 at the top, that the indicator unit 1 had been exposed to a temperature above −15° C.

Figure 7:
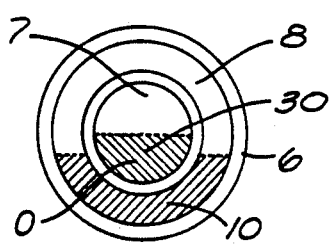
FIG. 7 shows a plan view of a third form of embodiment of an indicator unit in the molten state.
Figure 8:
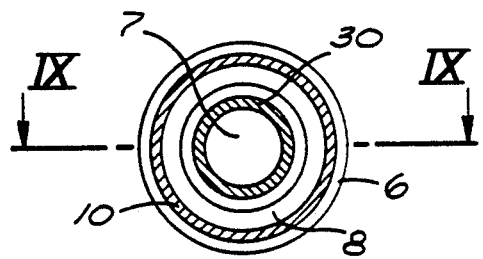
FIG. 8 shows the same indicator unit as in FIG. 7 in the operative condition.

FIGS. 7 and 8 illustrate another centrally symmetrical embodiment of an indicator unit 6, the indicators being produced in a specific form according to an inventive method.

FIG. 7 firstly shows such an indicator unit 6 which has a circular cavity 7 at its centre and an annular cavity 8 concentrically arranged with respect to the former. For example, a fluid 30 having a melting point at 0° C. is placed in the cavity 7, and a fluid 10 having a melting point of −10° C. is placed in the annular chamber 8. It is essential for the two cavities to be only filled partially so that the state shown in FIG. 8 is reached under rapid rotation, i.e. centrifuging of the indicator unit 6. The fluid 30 will accumulate on the outer surface of the circular cavity 7, and the fluid 10 will accumulate on the outer rim of the annular chamber 8. The indicator unit 6 may then be cooled intensively under continuing rotation, so that the fluids 10,30 appear as ice rings after freezing.

In this embodiment too, it is possible to monitor several temperatures by means of other concentric annular cavities.

FIG. 9 again shows a possible example of embodiment of the structure of the indicator unit 6, the cavities 7,8 being separated by an annular partition 20 within a transparent container. In this example of embodiment, it is also of importance that the volume of the annular cavities 7,8 should be substantially greater than the volume of the fluids 10,30 deposited in these cavities, so that a distribution of large area of the fluids 10,30 may be observed in the cavities 7,8 in question, and that an easy verification is assured, regarding whether a critical temperature had been exceeded.

Figure 10:
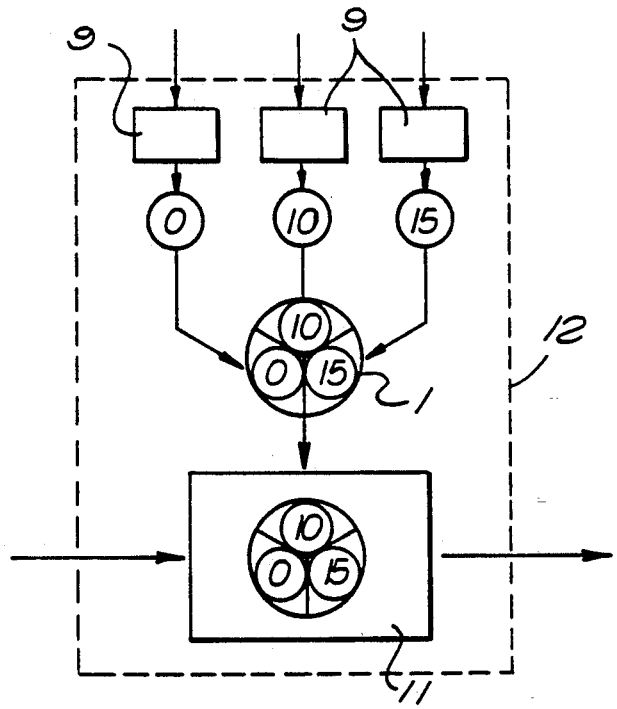
Figure 11:
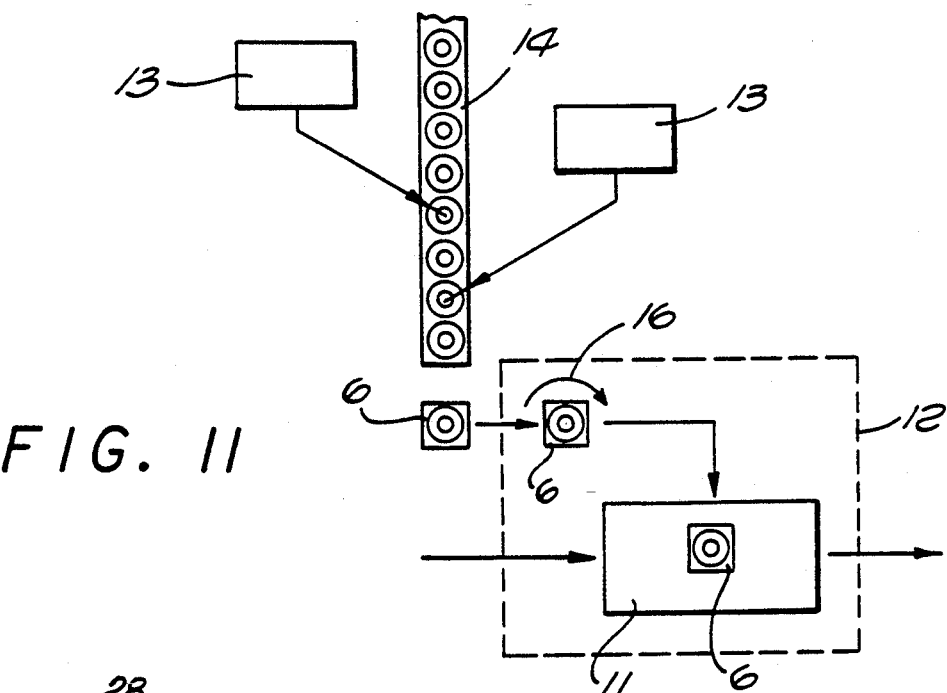

The process sequences according to the invention are illustrated in FIGS. 10 and 11.

The process consists in that the indicators having the different melting or rather freezing points are initially produced—i.e. frozen—in freezing chambers 9 in a specific shape, e.g. a spheroid or flat tablet. They are then placed in the indicator unit 1 and finally packaged with the deep-frozen product 11 in thermally conductive manner. For example, this may be performed by bonding or welding or in a common wrapper. In this process, it is necessary that all the production operations for the indicator unit 1 or rather of the indicators "0", "10", and "15" should be performed within the cold area 12 to prevent premature melting of the indicators.

This condition may easily be fulfilled in the case of industrial large-scale production, since deep-freezing operations also occur on large premises.

Figure 9:
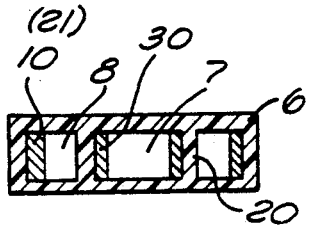
FIG. 9 shows a section along the line IX—IX in FIG. 8, FIG. 10 schematically shows the process steps for the production of an indicator unit as shown in FIGS. 1 to 6, FIG. 11 schematically shows the process steps for the production of an indicator unit as shown in FIGS. 7 to 9.

By contrast thereto, FIG. 11 shows a production method for indicators which is not restricted to these conditions. During the process sequence illustrated schematically, the circular and annular cavities 7,8 respectively as illustrated in FIGS. 7-9 are charged with fluids from metering systems 13. The transparent containers of the indicator unit 6 are placed in a row, one behind another, in a strip arrangement. The strip 14 is closed in known manner by means of a cover strip, and cut off.

The indicator unit 6 thus produced at room temperature in uncomplicated manner may be packaged, despatched and stored without special precautions. It is only shortly prior to the application of the indicator unit 6 on the deep-frozen product 11, that the indicator unit 6 is placed in rotational displacement by means of a small battery-driven centrifuge 16 and frozen thereby within the cold area 12, for example in a small domestic freezing compartment.

Figure 12:
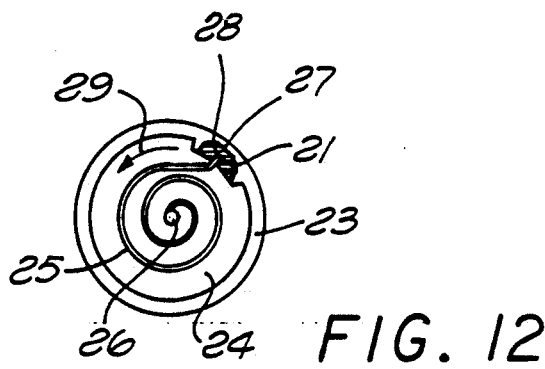
FIG. 12 shows a fourth example of an indicator unit in plan view.

FIG. 12 shows another indicator unit 23 in which the fluid of the indicator 21 is utilised only for indirect triggering of an indication which shows when the critical temperature range has been exceeded.

To this end, the indicator unit 23 comprises a transparent housing, the cavity 24 of which has a spring 25 in the form of a spiral extending outwards radially from a clamping point 26 and having its free outer spring extremity 28 dipping into a container 27 filled with fluid 21.

To establish the operational condition of this indicator unit 23, the spring is first held fast mechanically by auxiliary means (not shown), particularly so that the spring extremity is dipped under spring loading into the indicator fluid 21 present in the container 27. The indicator unit is deep-frozen in this position, the indicator 21 thereby solidifying and then automatically retaining the spring extremity.

After a critical temperature has been exceeded in the direction leading to thawing of the indicator 21, the spring extremity 28 flicks away in the direction of the arrow 29 and the fact that the critical temperature range has been exceeded may then be detected from the position of the spring 25.

Indirect indicator devices of this nature in which the indicator 21 merely actuates the indicator device when the melting point of the indicator fluid has been exceeded, are available in various forms of embodiment. It is also possible to make use of an unilaterally clamped straight flexing spring instead of a spirally wound spring 25. Electrical indicator devices and the like are also possible instead of mechanical indicator devices such as described by reference to the spring 25.

The production as well as application of the indicator 6 are not subject to any complex measures. An optional storage at room temperature, trouble-free transport and uncomplicated automatic production—equally at room temperature—characterise this indicator. The trouble-free shaping of the indicator fluid by centrifuging, almost simultaneously with intensive cooling of the foods, also however renders this method tailor-made for small-scale domestic application.

The most varied of substances may be utilised as materials for the indicator fluid, as already described in the foregoing. It is thus possible to utilise fluids or other solutions compatible with the environment, and even such as penetrate into the frozen merchandise upon thawing and render this frozen merchandise inedible or unusable.

In a development of the present invention, corresponding to FIGS. 13 to 16, an indicator unit 33 is proposed which, by comparison, does not comprise annularly shaped cavities of the embodiment in FIGS. 7 to 9, and which on the contrary has cavities 32 of circular segment shape formed in a carrier 31 consisting of plastics material. A part of this nature may be produced very easily by the deep-drawing method.

The carrier for this purpose comprises a plastics material foil, e.g. a polyethylene or PVC foil, wherein the cavities 32 in the form of circular segments which have been described, are produced by the deep-drawing method. This carrier 31 is covered on its upper side by a transparent foil 22 so that the cavities 32 are closed off completely.

Three cavities 32 of this nature are arranged in peripheral distribution in the carrier 31, in the example of embodiment shown.

Figure 13:
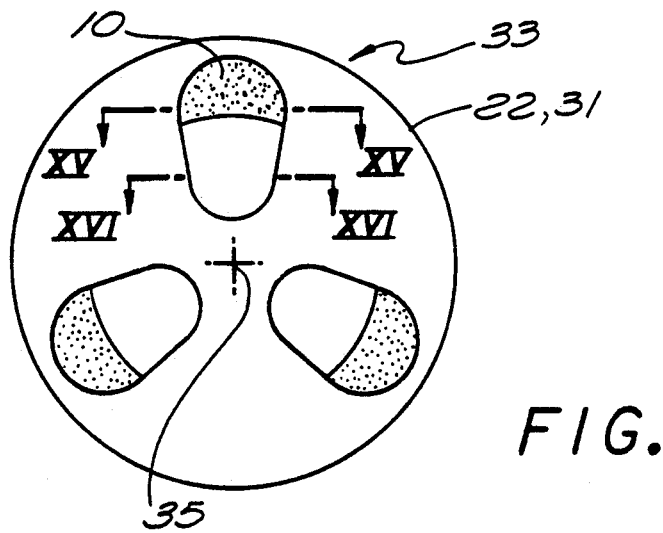
FIG. 13 shows a plan view of a fifth embodiment of an indicator unit in the frozen state.

The said indicator unit 33 is then exposed to the same centrifuging action as that described with reference to the embodiment according to FIGS. 7 to 9, to the effect that the indicator unit 33 is rotated around the axis of rotation 35 under simultaneous cooling action, so that the fluid 10 present in the cavities 32 is displaced radially outwards under the action of centrifugal force. After dropping below its critical temperature, this fluid 10 then acquires its solid state in the cavities 32, as illustrated in FIG. 13.

Let us point out again that the indicator unit 33 disclosed herein, and the other indicator units 3, 6, 23 as well, may be utilised to monitor cooled products as well as deep-frozen products.

Figure 14:
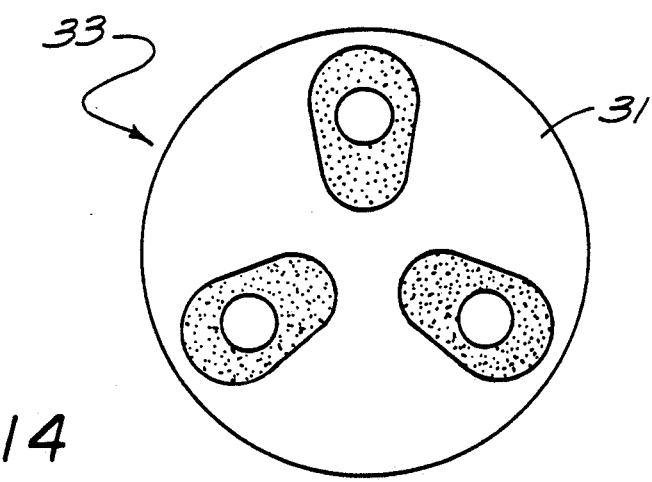
FIG. 14 shows a plan view corresponding to FIG. 13 in the molten state.
Figure 15:
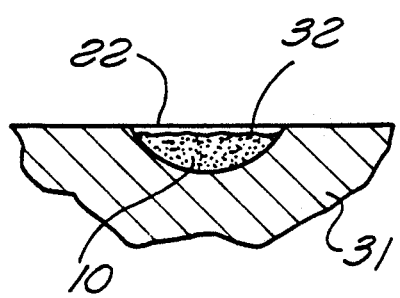
FIG. 15 shows a section along the line XV—XV in FIG. 13.
Figure 16:
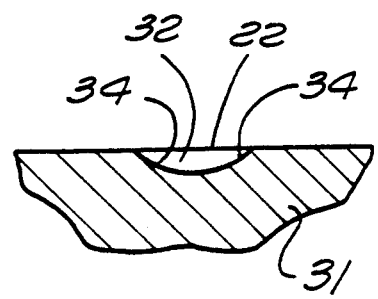
FIG. 16 shows a section along the line XVI—XVI in FIG. 13, FIG. 17a to 17d are illustrations of an indicator unit in four different operative states according to another form of embodiment of the invention.

If the indicator unit 33 is then exposed to a temperature such that the fluid 10 changes its aggregate state in the cavities 32, the fluid is then distributed throughout the cavity with circular areas being left according to FIG. 14.

It is important in this connection that the bottom of the cavities 32 should rise towards the axis of rotation 35 in radial direction, i.e. being produced in conical form. The fluid 10 is consequently distributed not only by the action of gravity whilst melting, because a distribution of the fluid under the action of gravity could be impaired by a disadvantageous location of the indicator unit.

On the contrary, the fluid 10 is distributed by capillary action, i.e. it creeps into all points of the cavity 32 by capillary effect, i.e. also against the centrifugal force, thereby assuring a particularly uniform distribution of the fluid throughout the cavity 32 irrespective of the position in which the indicator unit is then exposed to a heating action.

Such a distribution under capillary action has the supplemental advantage that it prevents possible fraudulent intentions, because a renewed centrifuging operation on the indicator unit once it had thawed is then no longer possible because traces of the fluid are then always visible in the capillary spaces of the cavity 32.

In this connection, it is of importance that the edges 34 of the base area of the cavity 32 should extend almost tangentially or at least at an acute angle to the foil 22, so that the required capillary spaces may be formed thereby.

The schematically illustrated examples should merely be interpreted as such, since numerous other specific shapes are also possible which are irreversibly lost after the melting action. Other references in this respect are apparent from the drawings.

Figure 17A:
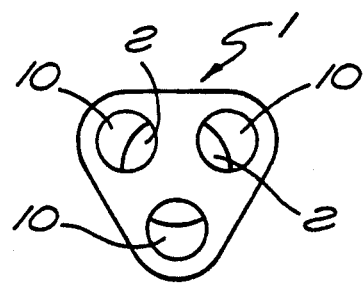
Figures 17B, 17C, 17D:
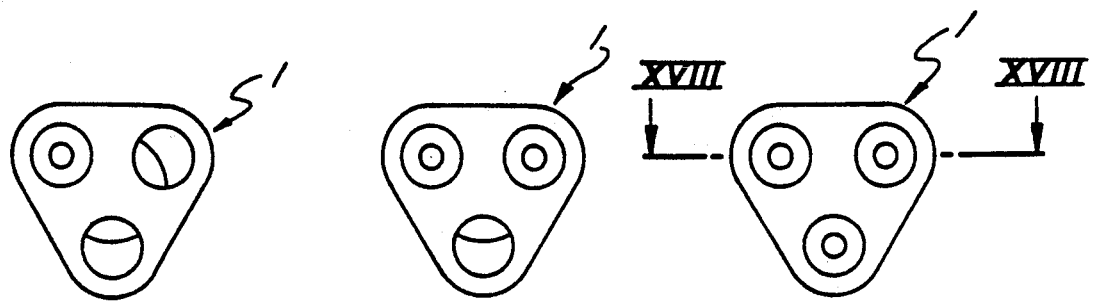
Figure 18:
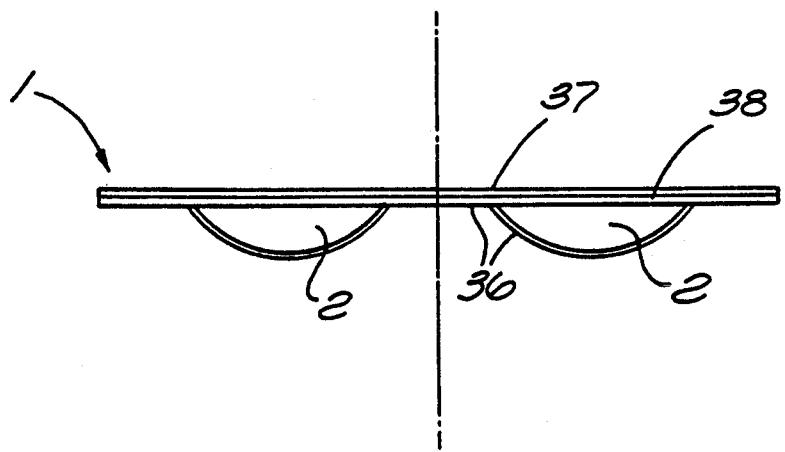
FIG. 18 is a schematic illustration of a section through an indicator unit in an embodiment as shown in FIG. 17.

FIGS. 17 and 18 shows another form of embodiment of an indicator unit 1 which according to FIG. 18 comprises a base-side foil, which is preferably produced as a metal foil 37. This metal foil is placed in thermally conductive contact with the cooled or frozen merchandise, this contact being established for example by means of appropriate organic or inorganic adhesives which display an adequate adhesivity even under cold action. Adhesives of this nature are, for example, organic adhesives such as—for example—milk or egg-white products, sugar solutions or honey solutions.

The metal foil 37 is joined by means of an appropriate hot-bonding agent to a plastics material foil 38, which for example can be produced as a PVC foil. The cavities 2 for reception of the indicator fluid 10 are formed in this PVC foil by deep-drawing or embossing.

It is then important that the metal foil 37 has a substantially higher degree of thermal conductivity than the plastics material foil 36, because the deep-frozen or cooled merchandise is thereby in constant thermally conductive contact with the metal foil 37. For example, if a ratio of 1:2 between the thermal conductivity of the metal foil 37 and the thermal conductivity of the plastics material foil 36 of is selected, this has the result that the indicator fluid 10 in thermal contact with the metal foil 37 really only thaws when the surface of the cooled or frozen merchandise actually also reaches the temperature required to thaw the indicator fluid 10.

Small temperature rises in the vicinity of the frozen merchandise which cannot cause sustained thawing of the frozen merchandise, consequently do not lead to a change of the indicator fluid 10.

FIG. 18 shows furthermore that the plastics material foil 36 forms the foil area 38 at the bottom of the cavity 2.

This embodiment is not essential and provision may equally well be made to omit this foil area 38 and for the metal foil 37 then to cover the cavities 2, say as a cover or seal. An even more satisfactory thermally conductive contact of the indicator fluid 10 with the metal foil 37 at the base side is thereby available. FIGS. 17a to 17d show four different functional conditions of the indicator unit, the important aspect in this embodiment being that the cavities as such no longer form capillary gaps but are simply constructed in convex shape according to FIG. 18.

To this end, FIG. 17a shows an indicator unit 1 following centrifuging within a frozen food chest or the like, the indicator fluid 10 being displaced outwards radially in the cavities 2 and assuming an approximately crescent-shaped configuration in the cavity 2 in question.

If the indicator unit 1 according to FIG. 17d is brought to a temperature of −14° C. for example, the top left-hand side indicator fluid 10 thaws, the indicator fluid 10 is distributed with the top left-hand side cavity and assumes the configuration according to FIG. 17b.

If the indicator unit 1 is thawed further according to FIG. 17c to a temperature of −8° C. for example, the indicator fluid 10 situated in the top right-hand side cavity also thaws and assumes the configuration illustrated in FIG. 17c.

Continued thawing of the indicator unit according to FIG. 17b demonstrates that all the indicator fluids have thawed in all the cavities and have been distributed evenly in the cavity 2 in question, a middle central air bubble being formed in each case. This form of embodiment is also fraudproof, since the original centrifuged shape cannot be resumed in case of renewed insertion. There are small mini-centrifuges for domestic application, which are utilised during the freezing-in of the indicator units 1, an ordinary 9 volt battery being placed outside a freezer chest for example, and the mini centrifuge being utilised within the deep freeze chest together with the indicator unit.

What we claim is:

1. A device for monitoring the temperature of cooled or deep-frozen products, such as foodstuffs, pharmaceuticals and the like, which provides a permanent indication that a critical temperature has been exceeded, wherein the device comprises a closed body having a centrally disposed axis, said body being transparent on at least one side; separating wall means disposed within said body for separating said body into an inner circular compartment having an outer surface and an outwardly disposed annular compartment having an outer surface concentric with said circular compartment; and at least one indicator fluid disposed within each of said compartments, each of said indicator fluids being disposed about said outer surfaces of each of said compartments and having a different melting point associated therewith, said indicator fluids being maintained in a predetermined position within each said compartment until the temperature of said product exceeds the melting point of said indicator fluid where-upon said fluid changes its predetermined position; said body with said fluids therein being whirled in a centrifuge, and the fluid in each compartment being thereby deposited on said outer surfaces of each compartment while being whirled under simultaneous cooling and solidifying on said outer surface of each compartment of the indicator unit thereby to determine said predetermined position.

* * * * *